United States Patent
Matchett et al.

Patent Number: 5,229,764
Date of Patent: Jul. 20, 1993

[54] CONTINUOUS BIOMETRIC AUTHENTICATION MATRIX

[76] Inventors: Noel D. Matchett; Brian D. Kehoe, both of 1001 Spring St., Ste. 123, Silver Spring, Md. 20910

[21] Appl. No.: 718,174

[22] Filed: Jun. 20, 1991

[51] Int. Cl.$^5$ .............................................. H04B 1/00
[52] U.S. Cl. .................................. 340/825.34; 382/2
[58] Field of Search ...................... 382/1, 2, 3, 4, 5, 6; 340/825.3, 825.31, 825.32, 825.34, 573; 235/380, 382, 382.5

[56] References Cited

U.S. PATENT DOCUMENTS 4,993,068  2/1991  Piosenka et al. ...................... 382/2

OTHER PUBLICATIONS

Rapid and Accurate Personnel Identification System, Jun. 1, 1985.

*Primary Examiner*—Sandra L. O'Shea
*Assistant Examiner*—Dervis Magistre
*Attorney, Agent, or Firm*—Armstrong, Westerman, Hattori, McLeland & Naughton

[57] ABSTRACT

A system activating and analyzing the biometric data from a plurality of biometrically-oriented personal identification devices at intermittent intervals selectively allows or prevents continued use of a particular protected system or device by a particular individual. The system is a continuous biometric authentication matrix which can employ any number of any variety of biometric personal identification devices including thumbscan, digital photo, voiceprints, fingerprints, and so on. The system acts as a continuously functioning "gate" between a system to be protected and a prospective user. A prospective user's biometric data is stored for reference. When the prospective user attempts to use the protected system or device, he or she must interface with the system, which then compares the prospective user's biometric data to the reference data. This comparison must not only be acceptably close in similarity in order to gain access to the protected system, it must also continue to be close in subsequent comparisons in order for access to the protected system or device to continue. The accept/reject threshold for individual biometric sensor devices is adjustable, as is the accept/reject threshold for the overall combination of biometric sensors.

24 Claims, 9 Drawing Sheets

FIG. 7
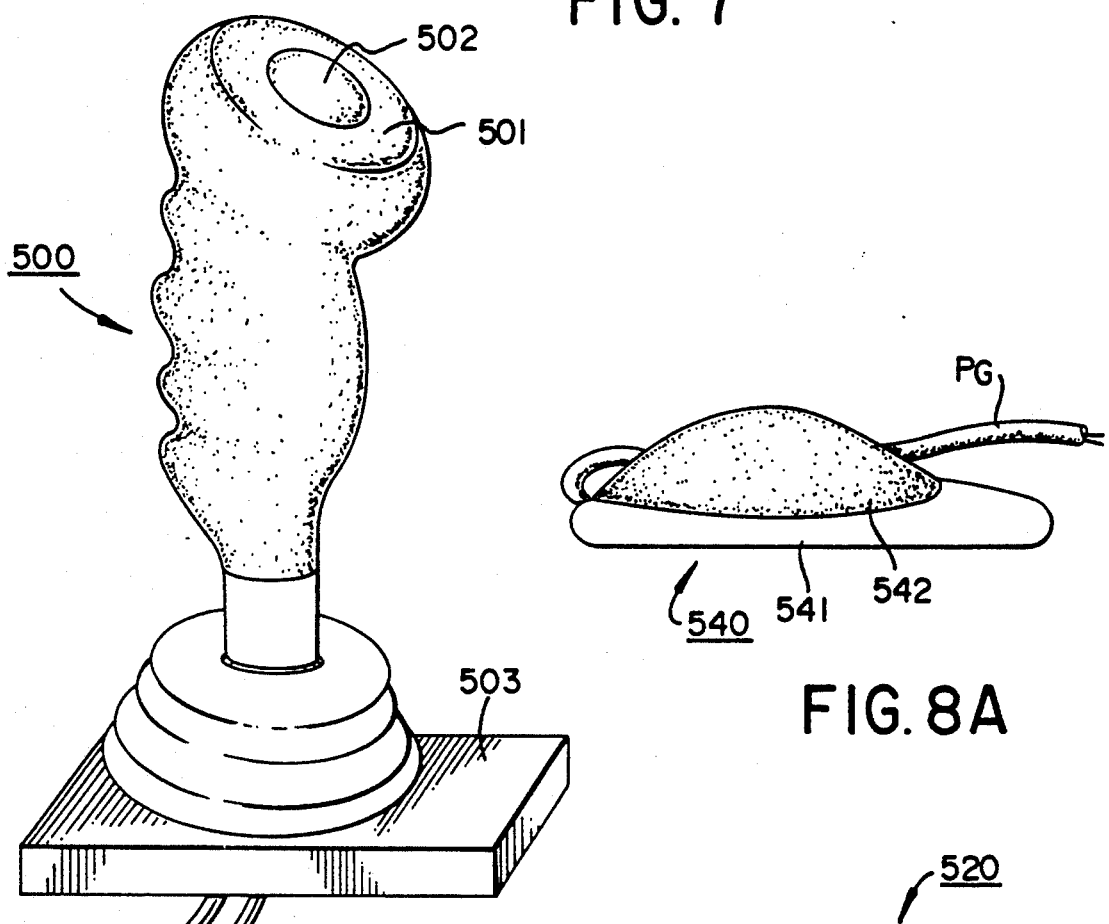
FIG. 8A
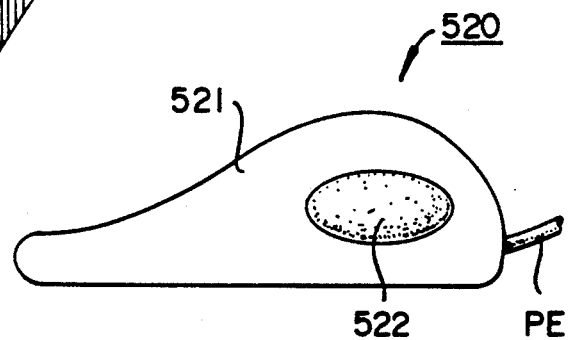
FIG. 8B
FIG. 9
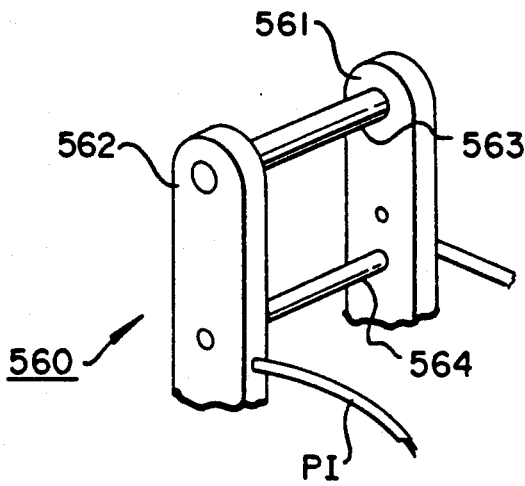

CONTINUOUS BIOMETRIC AUTHENTICATION MATRIX

BACKGROUND OF THE INVENTION

The present invention pertains to personal identification systems, and more particularly a number of systems for the generation of unforgeable identification data and subsequent comparison of continuously or intermittently generated identification data in order to protect access to certain systems and devices.

Security is becoming increasingly important as society relies more and more heavily upon information—its storage, communication, creation, transfer, and withdrawal. As the volume of information increases, so too does the number of storage sites, communication devices, and transfer and withdrawal sites.

As the volume of information and the value of information increases, so too does the motivation for theft. Theft of information is at present estimated to be a multibillion dollar industry.

Governments, corporations, and other entities recognize the need for access protection. They regularly spend millions of dollars for protection systems to protect their classified and sensitive information from unauthorized access, but no prior device exists to intermittently or continuously determine the authenticity and authorization of a person who is remotely accessing a database to read it or update it, or who is entering a transaction into an information processing system.

Additionally, it is rapidly becoming more desirable to restrict access to certain systems and pieces of equipment which have nothing to do with information security. For instance, the computer-based gaming (i.e., gambling) industry is being restricted in growth because access systems are not yet able to ensure non-use by minors. Fraudulent use of cellular phones by unauthorized users accounts for yearly losses estimated to exceed one hundred million dollars. Other systems in which access restriction is a problem unsolved in the art include military weapons systems, nuclear power plant controls, aircraft, locomotives, ships, and spacecraft, among many others.

There are many methods and systems whose sole purpose is the protection of certain equipment or systems from unauthorized user access. These protection systems include but are not limited to magnetic strip cards, Personal Identification Numbers (PINs), so-called "smart cards," passwords, keys, magnetic keys, and so on. All of these systems rely upon a piece of information or a physical artifact, in the possession of a rightful user, for access to be gained. The problems with this approach are evident, and examples of such problems are as follows. The information or artifact may be extracted from a rightful user under duress, the access-required information may be stolen through surveillance, or the physical artifact may be stolen and possibly even duplicated. Any of these possibilities would allow a fraudulent user to pose as a rightful user.

Other access protection systems employ certain physical traits, measurements, and other characteristics specific to a particular user. These physical characteristics are generally referred to as Biometric Data. These data include, but are certainly not limited to, palm, thumb, or fingerprints, voiceprint, digital photo, dynamic signature, sonic pulse signature, hand geometry, biochemical analysis, retinal scan, keyboard typing pattern, body measurements (e.g., height, weight, density, wrist width, etc.), signature analysis, and so on. As technology advances, the variety and accuracy of such data should increase.

Typically, biometric authentication systems store a prospective user's traits or characteristics for future reference. When the user initially seeks access to the protected system, his biometric data are again taken, then compared to the reference data previously stored. If the two sets of data are acceptably close in nature, user access is granted. If the two sets differ by more than a preset acceptability tolerance level, user access is denied at the very outset.

Some of these biometric authentication systems store the user's reference data on a smart card to be carried by the user. This presents problems regarding loss, theft, or tampering, although some versions encrypt the reference data to hinder tampering. Still others store the reference data in a reference "library," often off site. These libraries of data can be, and often are, encrypted for additional protection.

A number of biometric authentication systems, regarded as relatively more highly effective, employ a variety of biometric authentication devices (which may be abbreviated as BAD's). For instance, voiceprint analysis may be used in conjunction with hand geometry, e.g. a user may place his hand upon the reader and state his name. The comparison takes place and the user, if authentic, is admitted. Additional biometric devices may be employed, but this renders the system more difficult to use and raises the problem of "user-unfriendliness."

The problems with biometric authentication systems, as they exist now, are basically of two categories. First, they are decreasing rapidly in security effectiveness due to improvements in technology and increased ingenuity of adversaries. Second, they are user unfriendly and often intimidating to rightful users since such systems exist as an artificial barrier to a user attempting to use a protected system or device.

Present biometric authentication systems, no matter how sophisticated, basically act as a "gate" to a protected system. Once a prospective user gains entry to a protected system or access to a protected device, the user stays in, unchecked. The user is then free and clear. Technology can, in such systems, be made to work for non-rightful users, and such non-rightful users are often clever. A short term biometric "charade" (false credentials) can be manufactured. The charade need only be short term since only the initial check need be fooled. For instance, digital recording and playback devices may fool a one-time voiceprint analysis. Such a "charade" is difficult enough to sustain for a once only check—to be required to sustain it indefinitely could increase the difficulty to near impossibility. Therefore, if biometric checks are increased in duration and/or number, security would be enhanced.

Also, user substitution presents a similar problem. An authorized user, upon gaining entry to a protected system, could then turn the system over to an unauthorized user. Continuous or intermittent periodic biometric checks would eliminate this problem. Continued use of a protected system or device would be directly dependent upon continued "passing" of such intermittent biometric tests, especially if performed at random intervals.

As to the user-friendliness aspect of such continuous testing, since continuous checks must be made of the user, it would be preferable to make the biometric sensors less distracting by incorporating them into the system or device to be protected. This could, for example, include integrating the present invention into the user interface, thereby making the user subject to passing the biometric threshold each and every time the user interacts with the system.

SUMMARY OF THE INVENTION

The above and other objects are accomplished according to the invention in that a biometrically-based authentication system is provided which intermittently authenticates a user during use of a system, so as to improve system security.

The system is referred to hereafter as a continuous biometric authentication matrix, and can include any combination of hardware, software, and/or firmware which provides intermittent or continuous biometric checks of a user for the purpose of security protection of any system or device. The apparatus according to the present invention is incorporated into the functions of a protected system or device such that continued use of the protected system or device is directly dependent upon continued passing of the biometric tests according to a preselected threshold of acceptability. Further, the biometric sensors of a particular embodiment of the invention may be incorporated into the functional controls of a system or device to be protected.

The relevant biometric data, traits, and characteristics of the user are input to the system to be stored for reference. Later, during attempted usage of the device or system, the user again inputs his or her relevant biometric data. This data is compared to the reference data, and access is granted or denied. During use of the protected system or device, if access is granted, the user is continuously, at intermittent or random intervals, and/or at each attempt to command or interact with the system, retested and the new input biometric data compared to the reference data. If at any point during usage of the protected system or device the user should fail one test or a plurality of tests, the user's access would be terminated. The termination of access protocol may be varied according to application.

Additionally, acceptance/rejection thresholds of individual biometric tests may be adjusted according to the application. A hierarchy of individual biometric test weights may be incorporated, e.g., the tests may be weighted according to individual test accuracy. The present invention may use only one biometric device or a variety of biometric devices depending upon the application.

The above and other objects, features, and advantages of the present invention will be better understood from the following detailed description taken in conjunction with the accompanying drawings.

BRIEF DESCRIPTION OF THE DRAWINGS

FIG. 7 is a schematic drawing of a joystick as modified to incorporate a thumbscan sensor.

FIG. 8A is a schematic drawing of a computer mouse modified to incorporate a hand geometry scanning sensor, and FIG. 8B is a schematic drawing of a computer mouse modified to incorporate a thumbscan sensor.

FIG. 9 is a schematic drawing of a hand-control lever modified to incorporate at least one biometric authentication device.

DETAILED DESCRIPTION OF THE PREFERRED EMBODIMENT

In the following discussion, "continuous" authorization refers to sampling/comparison cycles, with the minimum period of cycles being equal to the minimum duration of the cycle for a given biometric authentication device. That is, if a thumbscan takes 6 seconds to complete one cycle, the maximum number of cycles per minute is ten.

Ultimately, true continuous authentication, requiring thousands of comparison cycles per second, may be achievable. Available technology at reasonable prices must progress for such true continuous testing to become widespread. With such technology, actual motion recognition, wherein a person's characteristic walk, for example, is immediately recognizable, or extremely accurate continuous facial recognition, should be obtainable.

Until then however, the continuous analysis at unpredictable intervals of the combined data from a plurality of biometric authentication devices overcomes the disadvantages inherent in the prior art devices and accordingly provides improved security. While only one biometric authentication device is necessary and is effective, security will increase with the number of disparate biometric authentication devices employed.

For all of the below-described configurations of the apparatus according to the present invention, the basic steps are as follows:

1. The recording of a particular user's relevant biometric characteristics and data.
2. The storage of such data for future reference.
3. The taking of new biometric data, corresponding to that taken at step (1) above, from a prospective user as he or she attempts to use a protected system or device.
4. The comparison of new biometric data to the user's reference biometric data.
5. The acceptance or rejection of the user based upon the results of comparison.

6. The continuous (intermittent and/or unpredictable) repetition of steps 3, 4, and 5, so long as the protected system or device is in use.
7. The rejection of the user and shutdown of the system if at any time during use the user fails more than a prescribed number of comparison tests.

Figure 1:
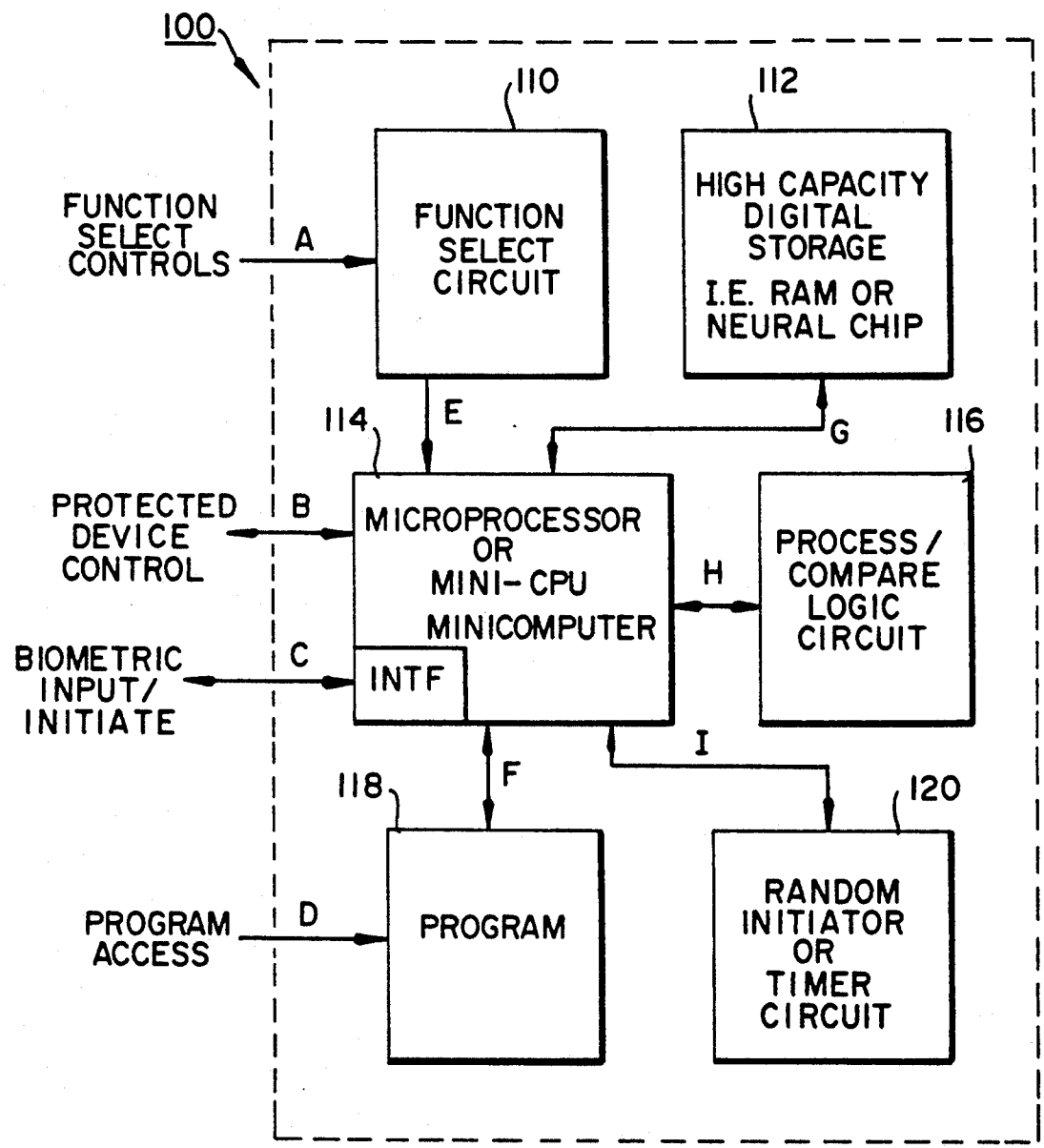
FIG. 1 is a schematic, block diagram of an embodiment of the present invention receiving one or two biometric inputs.

FIG. 1 depicts a schematic block diagram of a basic configuration of a system 100 which is an embodiment of a continuous biometric authentication matrix according to the present invention. This particular system is suitable for use with one, and perhaps two, biometric authentication devices (not shown in FIG. 1). For instance, if used with a voiceprint analyzer, the system 100 would be useful for the protection of cellular telephones from unauthorized use.

The system 100 includes a function specific microprocessor or microcomputer 114. The audio input for the voiceprint is taken through a mouthpiece transducer of the phone and the voiceprint biometric data is indicated by signal C. Using a selection switch (not shown) supplying a signal A to a function selection circuit 110, the system 100 can be made to take voice data for reference storage in a high capacity digital storage portion 112. This storage 112 can for example be a RAM, neural data storage chips, etc. The switch for the function select circuit 110 preferably is security governed, i.e., wherein the user punches a security code into the telephone. In this way only the user may gain access to operate the system initially or program the unit. The telephone and communication apparatus is considered conventional and is therefore is not shown. While the telephone is in use, the user's voice is periodically compared to the reference data by a process/compare logic circuit 116. The comparison may be initiated by a random initiator or timer circuit 120. Alternatively, if the voice biometric authentication device is word specific, the comparison may be initiated by the recognition of certain words. An operating program 118 is provided for the system, and access to the program is indicated by signal D in FIG. 1. Since the continued function of the telephone is dependent upon the decisions made by the system 100 according to the present invention, via access control, little if any fraudulent use would be possible. Also, by use of program access with code, a user could bypass the system protocol to allow a passenger to use the telephone. This bypass could have a one-call limit, for example, for safety.

As shown in FIG. 1, the entire embodiment may be embodied as an integrated circuit with the functional elements interacting as indicated, or the elements may be physically separated, discrete devices to suit the intended application. Signals between elements may be conducted electrically or by fiber optics, as required.

A rightful user selects the proper function, "PROGRAM" or "USE" with the controls by signal (A). Other functions can also be incorporated depending upon application. Should the user select "PROGRAM," he or she would then program the invention by signal (D) to accept his or her voice (for example) for reference. The voice data, digitized, would be input by the signal (C), processed as needed by the microprocessor 114, and then sent along a signal line (G) for storage in the high capacity digital storage 112. At a later time, if the user attempts to use the protected device, in this case the cellular telephone, the user would simply select "USE" and then speak into the telephone for an initial biometric voice analysis. Since the voice analysis input is incorporated into the telephone's mouthpiece, the user need not do anything other than attempt to use the telephone. The user's voice is input as the signal (C). The microprocessor 114 then gathers the stored reference data from the storage 112, and sends both the reference data and the new data as indicated by signal line (H) to the comparison element. The results of the comparison are sent back through signal line (H) to the microprocessor 114. The microprocessor 114, based on the programmed protocol sent through signal line (F), determines whether to allow continued function of the device, i.e. the cellular telephone. The microprocessor 114 selectively terminates use of the telephone function or continues to permit use of the telephone function through the signal (B), which may be a simple interruption point for a voice signal or may be a telephone power cutoff. If the telephone function is allowed to continue, and the function select remains at "USE," the random initiator or timer circuit 120 then periodically and intermittently (or unpredictably) prompts the microprocessor 114, through a signal sent along the signal line (I), to again gather voice data input and compare it to the reference data. This cycle continues so long as the function is set to "USE" and the telephone is off-hook. If at any time during use the number of comparison failures exceeds the predetermined number on the programmed protocol, the system 100 will terminate the function of the telephone or other device, and await the next user.

This basic configuration could also be used with other biometric authentication devices—digital photo for instance—to protect other types of devices. Such devices might include PC's, control panels, and interactive units, among other devices.

Figure 2:
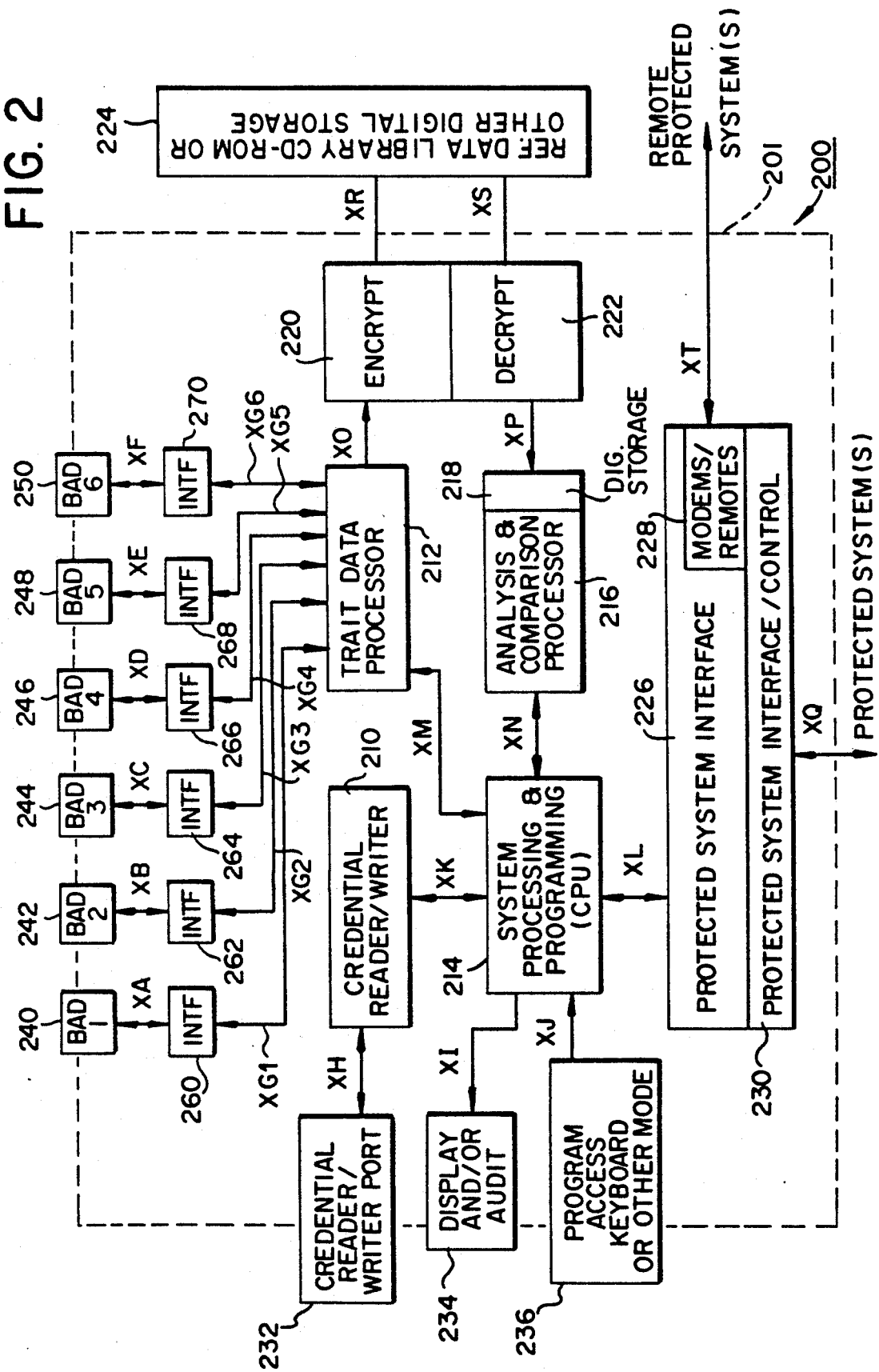
FIG. 2 is a schematic, block diagram of a computer-based embodiment of the present invention employing a plurality of biometric authentication devices.

FIG. 2 depicts a more complex embodiment of the present invention, showing a system 200 employing a plurality of biometric authentication devices 240-250. In this system, a user submits his biometric data, and possibly other data (e.g., through a digitizing scanner) through the various biometric authentication devices 240-250. These biometric authentication devices 240-250 are interfaced with a CPU 214 by interface devices 260-270, respectively. The data is processed—and may be also encrypted, if desired by encrypting and decrypting devices 220 and 222—and stored in a storage device 224 which may be a secure CD-ROM library or other digital storage site. The storage site may be either internal or remote, and may even constitute another CPU.

When a user wishes to use a protected system or device, he or she again must pass biometric authentication tests implemented via the biometric authentication devices 240-250. The new data obtained by the biometric authentication devices 240-250 is processed and compared to the user's reference data by the analysis and comparison processor 216. If the user has no reference data on file, the system 200 according to the present invention will not allow access to the protected system or device. If the pertinent reference data is on file, and the result of the comparison is favorable according to the parameters and protocols of the programming contained in the programming unit 226, the access is permitted. During use, the programming of the system 200 prompts the biometric authentication devices 240-250 to test the user periodically. These tests occur as long as the protected system or device is in use. Depending upon the application, the CPU 214 may or may not control each of the biometric authentication devices 240-250 independently, therefore the biometric authentication devices 240-250 may or may not be synchronized with one another temporally. For example, one biometric authentication device test might be executed only three times in a given minute, while another might be executed ten times per minute.

The embodiment depicted in FIG. 2 is a system 200 which is a computer-based embodiment of the present invention. As indicated in FIG. 2, all elements within the dashed line are parts of a trusted, secure computer system 201. Those elements outside the dashed line are outboard elements (i.e., not part of the computer system itself); of course, it is possible to configure the system in other ways for the intended use. Those elements that straddle or ride the dashed line may be inboard or outboard depending upon the particular circumstances, for the sake of desired use and convenience. Connections may be electrical, fiber optic, or other depending upon the intended application.

The programming used in the present invention may establish a hierarchy of test importance. For instance, test results of the more highly accurate tests can be weighed more heavily than that of less accurate tests, with regard to acceptance/rejection decision making The CPU 214, upon receiving indications of failed comparisons for a relatively inaccurate test may cause prompting of a more highly accurate test, before ultimately deciding whether to reject and subsequently shut down.

The programming according to the present invention may be accessed and altered through an appropriately secure terminal off site (not shown). The entire system complex may be monitored or audited from off site. The programming may, therefore, be customized according to the intended use.

The protected system programming co-exists and is dependent upon the programming according to the present invention. These programs may exist as two separate entities, or the instructions according to the present invention may be written into the protected system's programming.

A credential reader/writer 210, a trait data processor 212, an analysis and comparison processor 216, continuous biometric authentication matrix programming 214, and the protected system programming 226 are all elements of the system 200. Therefore, the connections between these elements, labeled as communication lines XK, XL, XM, and XN, are all internal, and are therefore part of the computer system 201. Also, if encryption/decryption is used, and is within the computer system, connections XO and XP would also be internal to the computer system 201. Depending on the type of computer used and the types of interfaces used, connections XG1-XG6 connecting the interface devices 260-270, respectively, to the computer may for example be either internal or hard-wired. Connections between the biometric authentication devices 240-250 and their respective interface devices 260-270 are made by communication lines XA, XB, XC, XD, XE, and XF. The communication lines XA, XB, XC, XD, XE, and XF are preferably hard-wired connections, but this can vary depending on the technology involved. Connections between the computer system 201 and the reference data library 224 is preferably by use of hard-wired connections XR and XS, and these connections XR and XS can be electrical, fiber optic, or RF, for example. Connection between the credential reader/writer port 232 and the credential reader/writer 210 is via communication line XH and would be hard-wired as well. A display and/or audit device 234 is connected via connection XI to the CPU 214. A program access connection XJ as provided between a program access keyboard device 236 and the CPU 214, for enabling access to the system programming. Connections between the system according to the present invention and the system(s) it protects are via communications lines XT and XQ, and these would be hard connections.

This particular configuration may be used to protect one or more systems or devices, or to protect access to a network.

Figure 3:
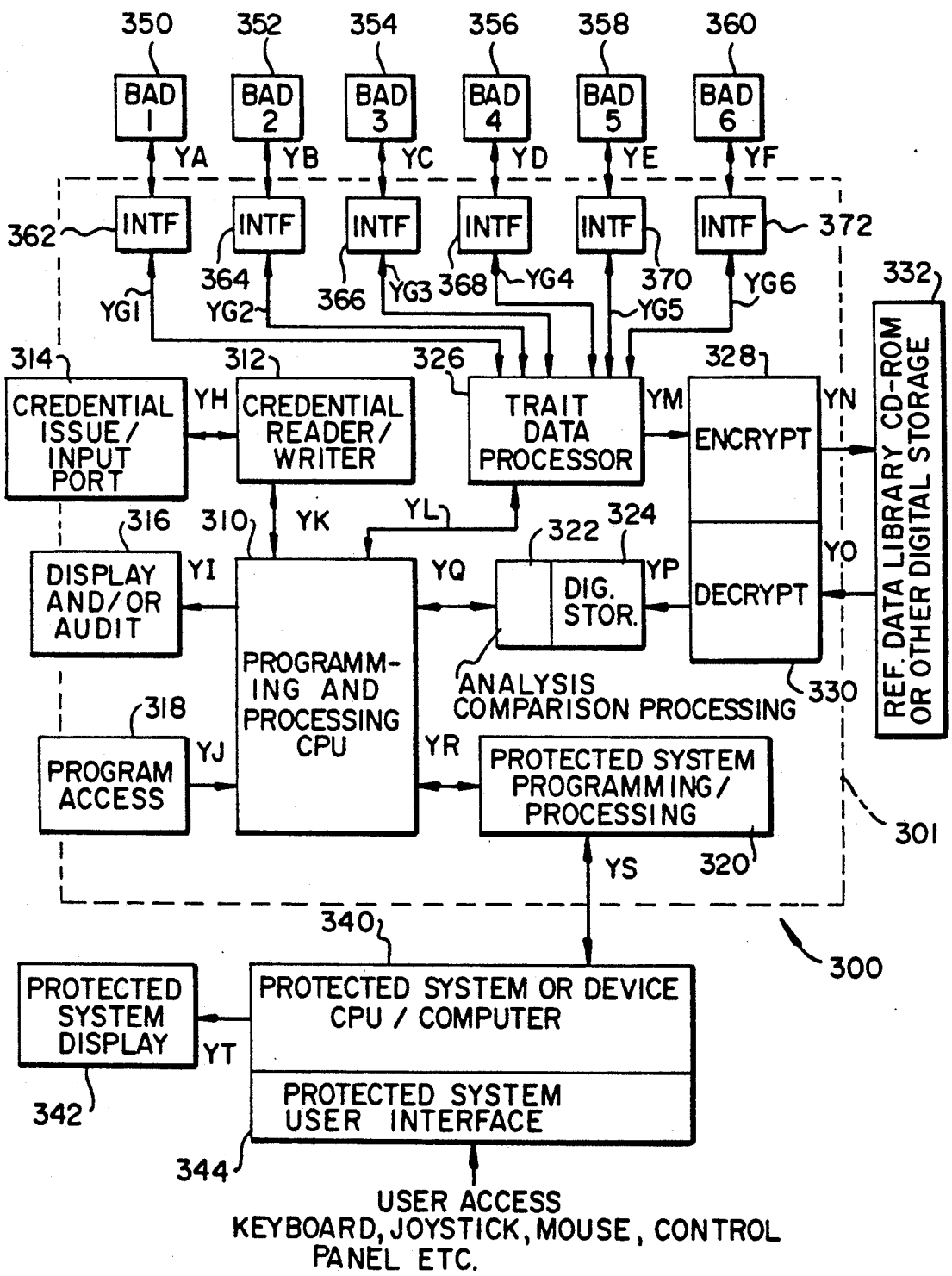
FIG. 3 is a schematic, block diagram of another computer-based embodiment of the present invention employing a plurality of various biometric authentication devices, showing a configuration in which the security programming and the protected system programming are physically separate.

FIG. 3 depicts an embodiment of the present invention similar to that in FIG. 2, but more suitable for use with larger protected systems or networks. The procedures and functions are substantially the same. This system is more remote from the protected system or device, allowing for access to and control of a system physically separate from the user.

This configuration depicts a CPU 310 for controlling the various functions according to the present invention for controlling a CPU of a protected system 340 which is dedicated to the protected system 340. In this configuration, a display/audit device 316, a CD-ROM/digital storage device 332, and a program access device 318 may each communicate with separate sites. These sites may be other CPU's or computer systems. Alternatively, any combination of the aforementioned three devices 316, 318, and 332 may communicate with one site or computer, for monitoring and control of the entire system 300 according to the present invention and the protected system 340.

As depicted in FIG. 3, the dashed line indicates a computer or computer system 301. A credential reader/writer 312, a trait data processor 326, a continuous biometric authentication matrix programming and processor CPU 310, an analysis/comparison processor 322, and a protected system programming/processor 320 are provided in the system 301. The communication lines YK, YL, YQ, and YR respectively connect to the CPU 310 the credential reader/writer 312, the trait data processor 326, the analysis/comparison processor 322, and the protected system programming/processing 320. The communication lines YK, YL, YQ, and YR are all internal connections within the computer system 301. Connections between the credential reader/writer 312 and the credential issue/input port 314 are made via the communication line YH (which is a hard-wired connection). The display/audit device 316 is connected to the CPU 310 by a communication line YI, which is also a hard-wired connection. The communication lines YH and YI can be electrical, fiber optic, or RF, for example. A communication line YJ connects the CPU 310 and the program access device 318, and this line may be hard-wired or may be internal, depending on the configuration and its intended use. Communication lines YA, YB, YC, YD, YE, and YF respectively connect biometric authentication devices 350-360 with respective interfaces 362-372. The communication lines YA, YB, YC, YD, YE, and YF are hard-wired connections. Communication lines YG1-YG6 between the trait data processor 326 and the interfaces 362-372 may be hard or internal, depending upon the configuration an its application. An encrypt/decrypt device 328, 330 (if required), would preferably be part of the computer system 301 (for increased security) and its connections YM and YP to the CPU 30 would be internal. Connections YN and YO between the encrypt/decrypt device 328, 330 to a reference data library 332 would be by hard-wired connections. Any connections YS between the system 301 and the protected device 340 would be by hard-wired connections.

This particular configuration would be ideal for protecting such systems as computer-based gambling, missile launch and control, computer networks, and other large, complex systems where access is spread out but scrupulous security and user authenticity is nevertheless required.

Figure 4:
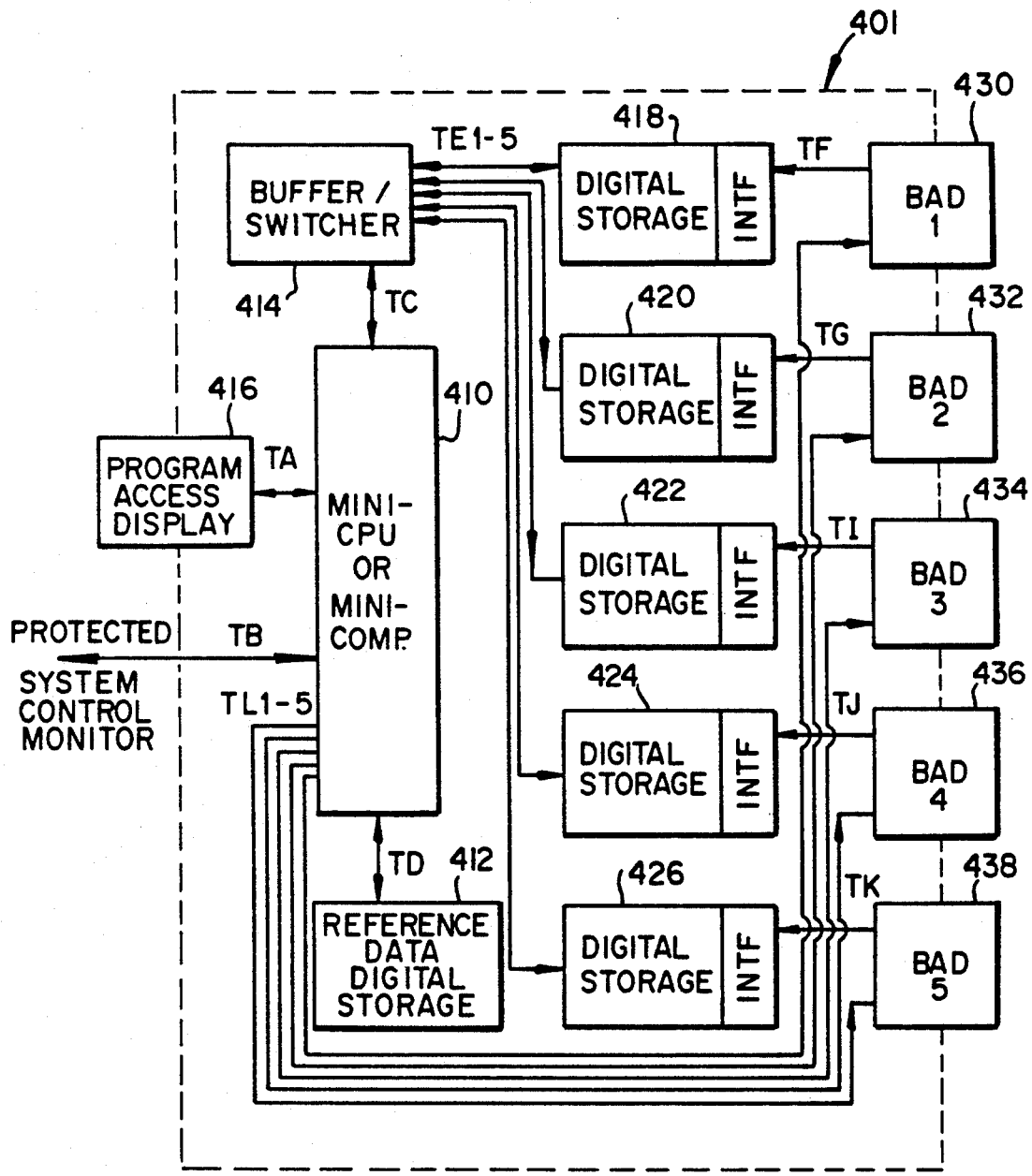
FIG. 4 is a schematic, block diagram of a portable, mini-computer-based embodiment of the present invention, employing a plurality of various biometric authentication devices.

FIG. 4 depicts an outboard embodiment of a system 400 according to the present invention, which is portable in nature and complementary to typical computer systems. The dotted line in this figure indicates those elements contained as part of a portable unit 401, while those elements straddling the dashed line may be inboard or outboard depending upon the particular circumstances, for the sake of desired use and convenience. Connections may be electrical, fiber optic, or other depending upon the intended application. The system 400 is an expansion of the configuration in FIG. 1, allowing for a plurality of biometric authentication devices 430-438 and the storage and feeding of their data. The user feeds his/her biometric data through the biometric authentication devices 430-438. The data is stored for reference in respective digital storage devices 418-426. When use of the protected system is desired, the user must again go through the biometric authentication devices 430-438. During use, the microprocessor or mini-CPU 410 periodically prompts each of the biometric authentication devices 430-438 to test the user. The data is stored in the respective one of the digital storage devices 418-426 until required by the microprocessor or mini-CPU 410, which then compares the newly stored data with the corresponding reference data. The reference data is stored in a reference data digital storage device 412. Based upon the results of the comparison, the microprocessor/mini-CPU 410 would either continue or terminate the user's access via communication line TB to the protected computer system (not shown in FIG. 4). A program access device 416 for this configuration could consist of a small keypad and LCD display, with a code being used for enabling program access. The digital storage devices 418-426 could comprise RAM chips, neural storage chips, or any other high capacity digital storage format. A buffer/switcher 414 is connected to all of the digital storage devices 418-426 and to the CPU 410, and is used to select one of the digital storage devices 418-426 under direction of the microprocessor/mini-CPU 410, and supply the data to it.

In the embodiment of the present invention in FIG. 4, the entire unit may be integrated into a compact, portable unit. All elements shown, with the possible exception of the biometric authentication devices 430-438, would be hard-wired connections, such as electrical or fiber optic communication lines, within the unit chassis (not shown). If the biometric devices 430-438 are outboard, the communication lines TF, TG, TI, TJ, TK between the biometric devices 430-438 and the interface units of the storage devices 418-426 would be hard-wired. The communication line TA between the mini-CPU/mini-computer 410 and its program access/display 416 would also be a hard-wired connection, such as electrical or fiber optic. The communication line TB between the mini-CPU/mini-computer 410 and the protected system or device (not shown in FIG. 4) could also be electrical, fiber optic, or possibly RF connections. All other connections (TC, TD, TE1- TE5, TL1-TL5) could be electrical or fiber optic connections, for example.

Security protection could be enhanced by instructing the protected system to shut down should it be disconnected from the system 400 according to the present invention. Using such connection-dependent instructions, the protected computer's keyboard could be connected through a chassis of the system 400 according to the present invention.

Figure 5:
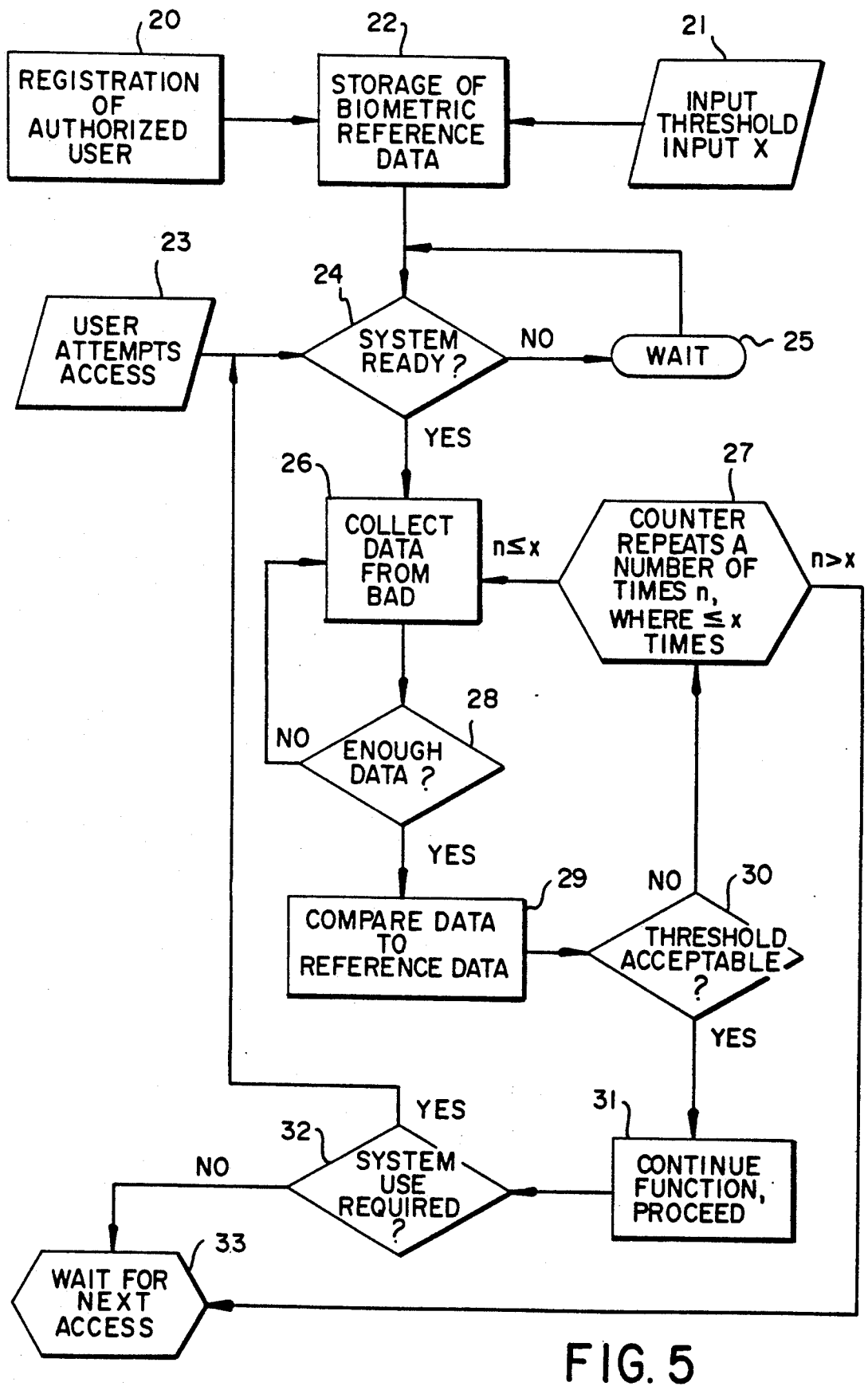
FIG. 5 is a flowchart diagram of steps used in a basic embodiment of the present invention such as that shown in FIG. 1.

A flowchart is illustrated in FIG. 5 depicting operation of the system 100 of FIG. 1. Step 20 indicates registration of an authorized user, such registration being stored as biometric reference data at step 22. An input threshold input is supplied at step 21, and is also stored in the biometric reference data storage step 22. If the system is determined to be ready at step 24, data is collected from the biometric authentication device(s) at 26, otherwise the system waits as indicated at 25 and queries again later whether the system is ready. Sufficiency of the amount of data collected at step 26 is queried at step 24, and if the data is insufficient, step 26 is repeated. If the collected data is determined to be sufficient at step 28, then this collected data is compared to the reference data at step 29. Step 30 determines whether the threshold is acceptable; if not, a counter tests whether the step 26 has been repeated a predetermined number of times x (for a delay) by tracking the number of iterations n and comparing the number n to the predetermined number x, so that step 26 is repeated x times. If the threshold is acceptable, the system proceeds as indicated at step 31. Step 32 determines whether system use is required, and if so branches to step 24; otherwise control branches to step 33 which is a wait step for the next access.

Figure 6A:
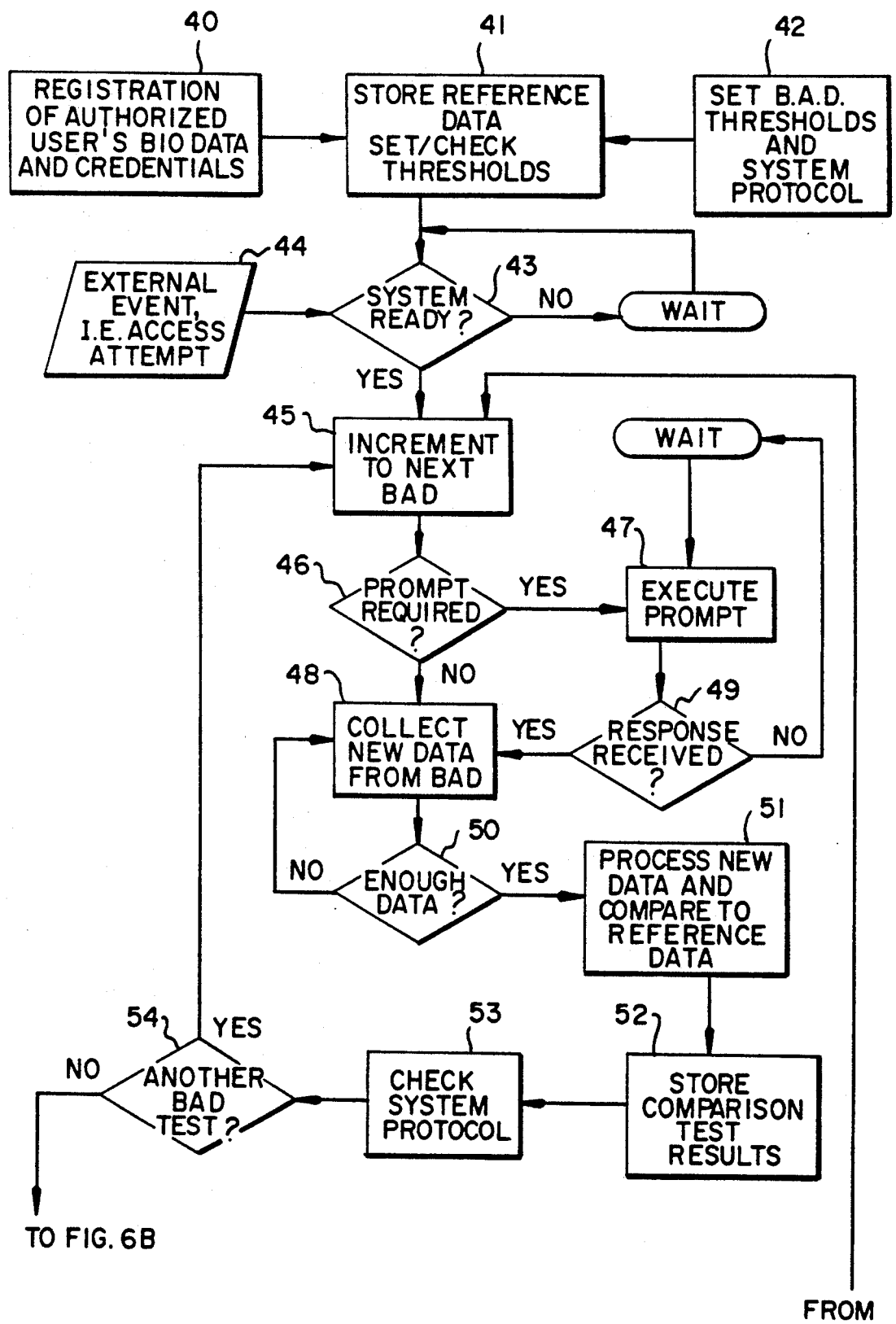
FIGS. 6A and 6B together form a flowchart diagram of the basic logical steps for a more sophisticated embodiment of the present invention.
Figure 6B:
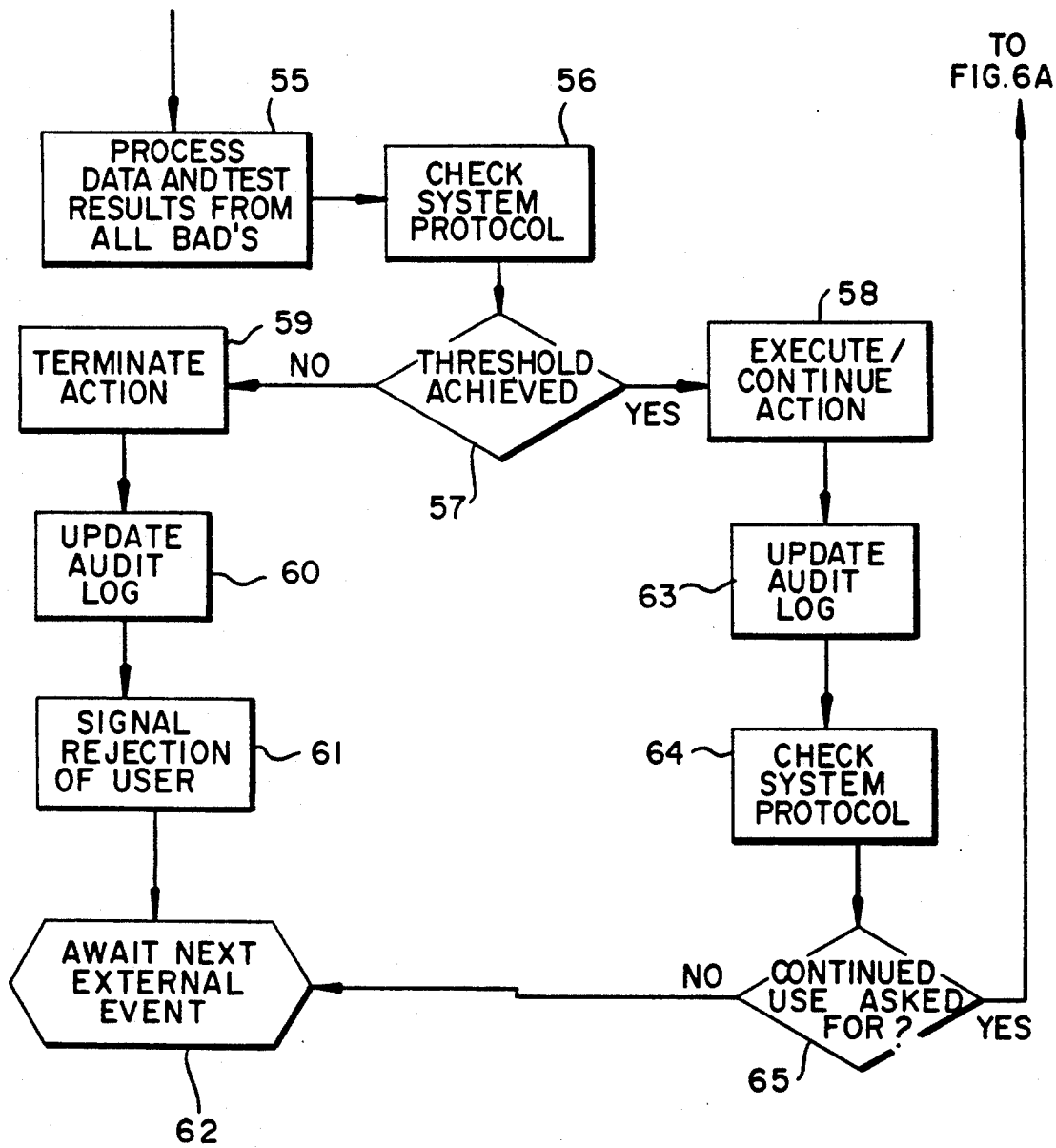

FIGS. 6A and 6B show two parts of a single flowchart illustrating steps followed in a relatively complex arrangement. As shown in FIG. 6A, registration of authorized users and storage of their biometric data and credentials take place as indicated at block 40. Also, biometric authentication device thresholds and system protocols are set at block 42. Then at block 41, reference data is stored, and thresholds of the biometric authentication devices are set or checked. After this, upon an external event such as an access attempt indicated at block 44, is at block 43 the system is determined to be not ready, branching is to a wait state which then loops back to block 43. If the system is determined to be ready at block 43, a biometric authentication device is selected at block 45, a determination is made whether a prompt is required at step 46, and if a prompt is required then the prompt is executed at step 47. When a response is received to the prompt as indicated at block 49, branching occurs to block 48. If no prompt is required at step 46, then new data is collected from the biometric authentication device selected as indicated at block 48. A decision is made at block 50 whether sufficient data has been collected and if not, return is made to block 48, otherwise branching occurs to block 51 where the new data is compared to the reference data.

Then, at block 52 the comparison test results from block 51 are stored, then the system protocol is checked as indicated at block 53. After this, determination is made whether another biometric authentication device test is to be conducted and if so, branching is to block 45. If no further biometric authentication device test is to be conducted, then branching is to block 55 of FIG. 6B for processing of data and test results from all of the biometric authentication devices.

System protocol is checked at block 56 and at step 57 it is determined whether the threshold has been achieved. If not, branching is to block 59 to terminate action, otherwise to block 58 to continue action. If action is terminated, then the audit log is updated as indicated at block 60, rejection is signaled to the user at block 61, and the system awaits another external event as indicated at block 62. If action is continued as indicated at block 58, then the audit log is updated as indicated at block 63, the system protocol is checked as indicated at block 64, and the system determines at step 65 whether continued use is indicated. If continued use is not indicated, branching is to block 62 to await another external event, while if continued use is indicated branching is to block 45 of FIG. 6A.

As mentioned previously, the continuous use of the biometric authentication devices for a given configuration could be made more user friendly by incorporating the biometric authentication devices into user interface controls of a protected system or device, and embodiments of such user interface controls are described further hereunder.

An example of the above-mentioned technique involving the continuous use of the biometric authentication devices can be seen from the description of FIG. 1. As discussed in the foregoing, the audio input required for the voiceprint analysis biometric authentication device according to FIG. 1 is gathered through the telephone mouthpiece audio transducer. Hence, the user's voice is sampled periodically, randomly, or even continuously while he or she is conversing.

In another configuration of the system according to the present invention for protecting another device or system, word recognition may be employed during the normal use of the protected system. Voice commands that are normally employed during the use of a protected system may be part of a reference list, and the system according to the present invention can then voice-analyze these word commands each time they are spoken. Or, the system according to the present invention may voice-analyze a user's spoken reply to a visual or audio prompt or question.

This principle (that the biometric authentication device used is passive, i.e. not requiring affirmative action by the user) may be applied to a number of biometric authentication devices.

As indicated in FIG. 7, in another embodiment of a biometric authentication device, a thumbscan sensor 502 is incorporated into a handle 501 of a joystick 500. The thumbscan sensor 502 is positioned beneath the normal thumb position on the joystick 500. The connecting leads of the sensor 502 are fed through the joystick 500 and back to a thumbscan processing unit (not shown). In FIG. 7, a sensor lead PB and a normal joystick function lead PC are shown extending away from the joystick 500 to their respective inputs.

Suitable thumbscan units are available commercially. These include Thumbscan, Inc.'s Access Key Unit and both the Mint 11 and Minte 21 by Fingermatrix, Inc. The same principle may be applied to fingerprints for other hand-oriented controls, or toeprints for certain pedal-type controls. In the device of FIG. 7, a metal or plastic hood may be added to the top of the joystick 500 to ensure continuously snug thumb contact during use.

In FIG. 8A, a computer mouse 540 is depicted having a thumbscan unit sensor 542 incorporated into it in a similar manner to that of the joystick 500 of FIG. 7. The thumbscan unit sensor 542 may be oriented relative to a mouse casing 541, adapting it for either right-handed persons or left-handed persons, or both. A mouse lead PE is modified, or replaced, to carry both the mouse data and the sensor data.

Shown in FIG. 8B is a computer mouse 520 carrying a hand geometry reader 522 in a mouse casing 521. The hand geometry reader or scanner 522 is wired through the mouse 520 and its lead runs back to the rest of the scanning unit along the same conduit PG as that of the mouse 520.

In FIG. 9, a common lever-type control 560 is modified for biometric authentication by provision of a sensor portion 563 supported between lever arms 561 and 562. A support bar 564 stabilizes the lever arms 563 and 562. The sensor portion 561 can be adapted to sense hand geometry or hand pressure characteristics, or perform a palmscan, thumbscan, or fingerprint scan. Again, the sensing device 563 is incorporated into the control device 560 itself, in this case as a bar or plate 563 grasped by the user's hand. A data-carrying lead PI of the control 560 communicates with a control apparatus (not shown in FIG. 9).

Other biometric authentication devices can also be incorporated. For example, a digital photo lens may be concealed in a control panel, an electronic weighing device may be concealed in a stool or chair before a control console, and a typing pattern pickup may be installed in a computer's keypad. Use of such devices is considered as being within the scope of the present invention.

Figure 10:
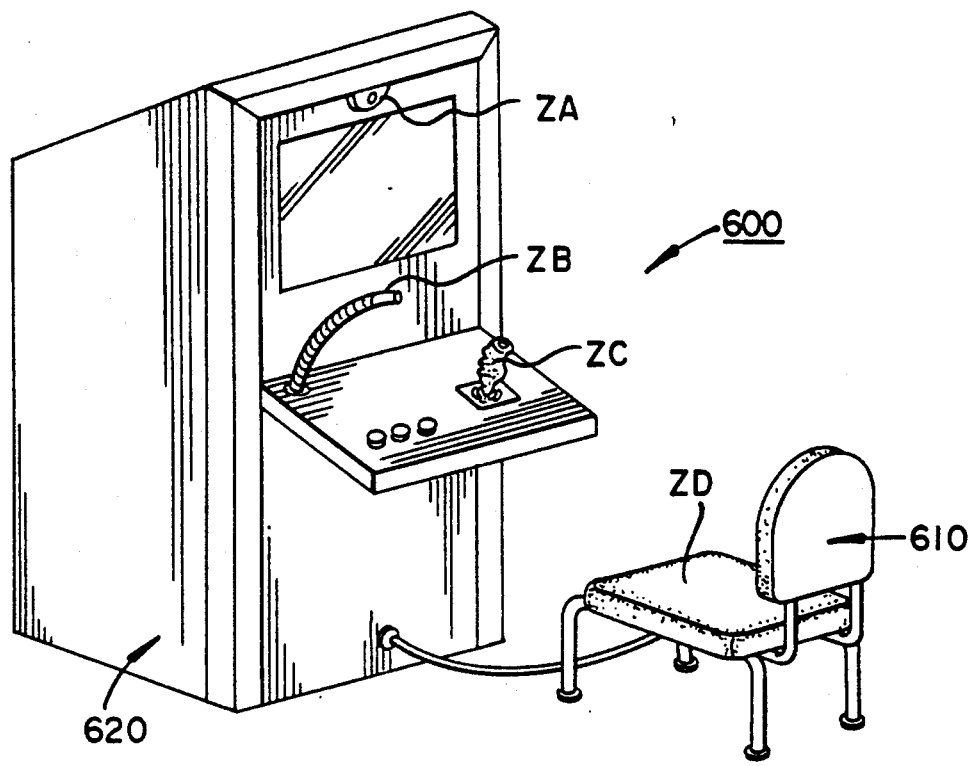
FIG. 10 is a schematic drawing of a video-type gaming terminal protected by a system according to the present invention.

FIG. 10 depicts a typical video-oriented gaming terminal 600 modified to incorporate the system according to the present invention. A lens ZA used for digital photo comparison input is mounted in a cabinet 620 such that the user is in constant view. This particular biometric authentication device is entirely passive and requires no special activity by the user. A microphone ZB is panel mounted, and is also a biometric authentication device. This microphone could for example be used in the process of a game or other interactive operation with the gaming terminal 600, to enable the user to respond to visual and/or audio prompts by the game, or to enter commands for the game.

In the system of FIG. 10, the audio data provided by the voice of the user can also be used according to the present invention as a biometric authentication device for enabling voice analysis to be performed as a way of authenticating the user. In this fashion, the user does not know which voice responses and commands are tested, or how often, or when. Depending on the security required, the system may or may not prompt the user in a vein unrelated to the game. A joystick ZC is shown with a thumbscan sensor built into it, and with this device a thumbscan could be taken of the user's thumb as desired during the course of the game, and the user would not know when such scans are taken, or how often. This is a completely passive biometric test which would not interfere with normal gaming activity. A weight sensor ZD is built into the player's chair or stool 610, and has a lead which runs back to the gaming unit and the system according to the present invention system. This, too, is a completely passive biometric test, requiring no user activity not game related.

Figure 11:
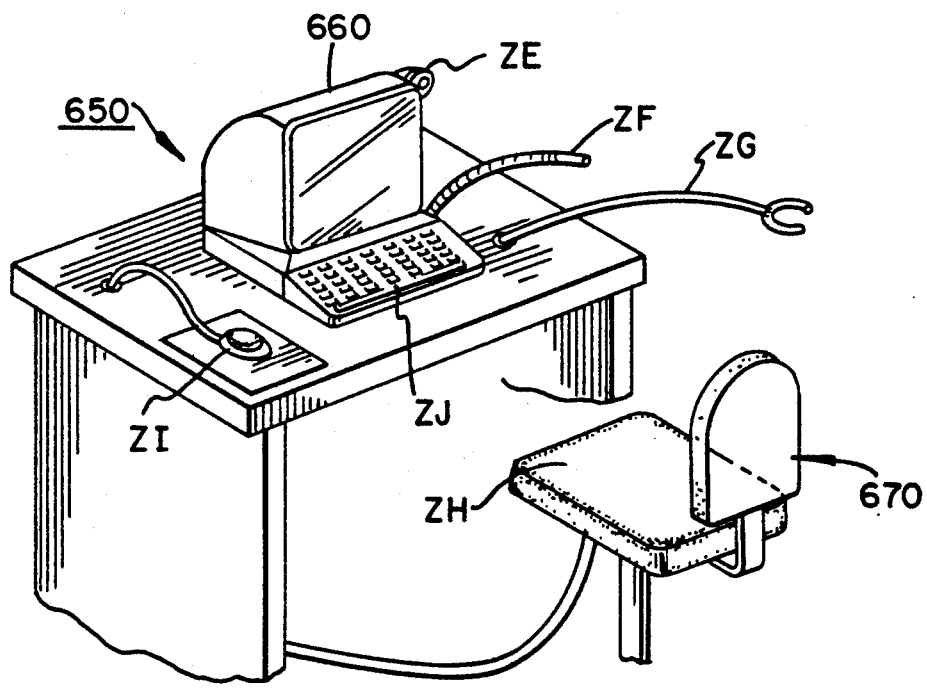
FIG. 11 is a schematic drawing of a typical computer work station protected by a system according to the present invention.

FIG. 11 depicts a typical computer station 650 protected by the system according to the present invention. A lens ZE for a digital photo comparison input is mounted to a monitor 660 so that the user is always in view. Again, this is a form of a biometric authentication device according to the invention which is passive and which requires no user activity unrelated to normal computer use. A microphone ZF is also provided for receiving voice commands and replies, and also serves as an input source for the voice analysis biometric authentication device of the system according to the present invention. Suitable voice analysis devices are commercially available. They include the VoiceKey or VoicePak by ECCO Industries, Inc.; the MicroIntroVoice, IntroVoice V, IntroVoice VI, PTVC series and HAL series, all by Voice Connexion, among others.

In the system of FIG. 11, a wrist circumference sensor ZG can also connected for use as a biometric authentication device. This biometric authentication device is completely passive—it need only be attached at the beginning of use and left on for the duration of use. A weight sensor ZH in a chair 670 is also a passive device which is non-interfering with the user. A thumb-scanning or hand geometry-reading mouse ZI is part of the system 650 of FIG. 11 and is also a passive device. The user need only employ the mouse ZI in a usual fashion, and the user will not know when or how often biometric tests are performed. Also shown is a station keypad ZJ which is fitted with a sensing device which determines the user's typing pattern for biometric analysis and comparison. Such a biometric test is also passive, and could be employed repeatedly and unpredictably during station use.

Whatever the method, the objective of such incorporation is to lessen distraction caused by any of the biometric authentication devices. In this way, the system according to the present invention improves the security of a protected system or device while maintaining a low profile, with a minimum of diversion from, or interference with, the protected system or device.

Actual configurations and embodiments of the system according to the present invention can vary widely according to application, security needs, and progress in applicable technology. It is therefore contemplated as being within the scope of the present invention to include all systems and configurations by which biometric and other data are continuously and/or intermittently taken and compared to a body of similar reference data for the purpose of authentication, such authentication being a prerequisite for access to, and continued use of, a protected system or device.

Although a preferred embodiment of the invention has been shown and described, it will be readily apparent to those skilled in the art that various modifications may be made therein without departing from the spirit of the invention or from the scope of the appended claims.

What is claimed is:

1. A system for controlling access to a protected system or device at intermittent intervals during use by an individual, comprising:
 a biometric authentication device for detecting biometric data of the individual, said biometric authentication device producing biometric output data; and
 computing means receiving said biometric output data of said biometric authentication device and comparing said biometric output data with stored biometric data representing an individual authorized to use the protected system, for selectively enabling or disabling access to the protected system or device; said computing means including an intermittent initiating means for initiating collection of data from said biometric authentication device at intermittent intervals during use of the protected system or device by said individual.

2. A system for controlling access as claimed in claim 1, wherein said computing means comprises a CPU and a digital storage means containing said stored biometric data.

3. A system for controlling access as claimed in claim 1, wherein said computing means comprises a digital storage means for controlling said stored biometric data, a CPU, a program storage containing a program for said CPU, and a compare logic circuit for comparing the output of said biometric authentication device with a predetermined threshold value.

4. A system for controlling access as claimed in claim 1, wherein said computing means comprises a digital storage means for containing said stored biometric data and a CPU.

5. A system for controlling access as claimed in claim 4, wherein said computing means further comprises a function select circuit for selectively causing initiation of collection of data from said biometric authentication device, in order to permit the individual to begin use of the system or device.

6. A system for controlling access to a protected system or device at intermittent intervals during use by an individual, comprising:
 a plurality of biometric authentication devices for detecting biometric data of the individual, said biometric authentication devices each producing biometric output data; and
 computing means receiving said biometric output data of each of said biometric authentication devices and comparing said biometric output data with stored biometric data corresponding to that collected by said biometric authentication devices, said stored biometric data representing an individual authorized to use the protected system, for selectively enabling or disabling access to the protected system or device; said computing means including an intermittent initiating means for initiating collection of data from each of said plurality of biometric authentication devices at intermittent intervals during use of the protected system or device by said individual.

7. A system for controlling access as claimed in claim 6, wherein said computing means comprises a CPU and a digital storage means containing said stored biometric data.

8. A system for controlling access as claimed in claim 6, wherein said computing means comprises a digital storage means for containing said stored biometric data, a CPU, a program storage containing a program for said CPU, and a compare logic circuit for comparing the output of each of said biometric authentication devices with corresponding predetermined threshold values.

9. A system for controlling access as claimed in claim 6, wherein said computing means comprises a digital storage means for containing said stored biometric data and a CPU.

10. A system for controlling access as claimed in claim 9, wherein said computing means further comprises a function select circuit for selectively causing initiation of collection of data from said biometric authentication device, in order to permit the individual to begin use of the system or device.

11. A method for controlling access to a protected system or device at intermittent intervals during use by an individual, comprising the steps of:

providing storage means for storing biometric data relating to an individual;

measuring biometric data relating to the individual and storing the measured biometric data in said storage means;

providing a plurality of biometric authentication devices for detecting biometric data of the individual;

using each of said biometric authentication devices to produce biometric output data;

providing a computing means for receiving said biometric output data of each of said biometric authentication devices, said computing means including an intermittent initiating means for initiating collection of data from each of said plurality of biometric authentication devices at intermittent intervals during use of the protected system or device by said individual;

using said computing means to compare said biometric output data with the biometric data stored in said storage means, for selectively enabling or disabling access to the protected system or device by the individual.

12. A method for controlling access as claimed in claim 11, wherein said computing means comprises a CPU.

13. A method for controlling access as claimed in claim 11, wherein said computing means comprises a CPU, a program storage containing a program for said CPU, and a compare logic circuit for comparing the output of each said biometric authentication device with the stored biometric data.

14. A method for controlling access as claimed in claim 11, wherein said computing means comprises a CPU.

15. A method for controlling access to a protected system or device at intermittent intervals during normal use by an individual comprising the steps of:

providing storage means for storing biometric data relating to an individual;

measuring biometric data relating to the individual and storing the measured biometric data in said storage means;

providing a plurality of biometric authentication devices for detecting biometric data of the individual;

using each of said biometric authentication devices to produce biometric output data;

providing a computing means for receiving said biometric output data of each of said biometric authentication devices;

providing a user manipulatable interface means for communicating with said computing means, wherein said user manipulatable interface means comprises a manipulatable device which is connected with said biometric authentication device so that biometric output data is supplied by said user manipulatable interface means during normal use of said user manipulatable interface means by the individual; and using said computing means to compare said biometric output data with the biometric data stored in said storage means, for selectively enabling or disabling access to the protected system or device by the individual.

16. A method for controlling access as claimed in claim 15, wherein said user manipulatable interface means comprises a mouse device.

17. A method for controlling access as claimed in claim 16, wherein said biometric authentication device comprises a fingerprint reader mounted in said mouse device.

18. A method for controlling access as claimed in claim 15, wherein said user manipulatable interface means comprises a joystick device.

19. A method for controlling access as claimed in claim 18, wherein said biometric authentication device comprises a fingerprint reader mounted in said joystick device.

20. A system for controlling access as claimed in claim 6, further comprising at least one user manipulatable interface means for communicating with said computing means, wherein said at least one user manipulatable interface means comprises a manipulatable device integrated with one of said plurality of biometric authentication devices.

21. A system for controlling access as claimed in claim 1, wherein said intermittent intervals are periodic, equal intervals.

22. A system for controlling access as claimed in claim 1, wherein said intermittent intervals are non-equal intervals.

23. A system for controlling access as claimed in claim 1, wherein said intermittent intervals are randomly selected intervals.

24. A system for controlling access to a protected system or device during normal use by an individual, comprising:

a biometric authentication device for detecting biometric data of the individual, said biometric authentication device producing biometric output data;

computing means receiving said biometric output data of said biometric authentication device and comparing said biometric output data with said stored biometric data representing an individual authorized to use the protected system or device, for selectively enabling or disabling access to the protected system or device during normal use of the protected system or device by the individual; said computing means including an initiating means for initiating collection of data from said biometric authentication device during normal use of the protected system or device by said individual; and a user manipulatable interface means for communicating with said computing means, wherein said user manipulatable interface means comprises a manipulatable device integrated with said biometric authentication device.

* * * * *

UNITED STATES PATENT AND TRADEMARK OFFICE
CERTIFICATE OF CORRECTION

PATENT NO. : 5,229,764  
APPLICATION NO. : 07/718174  
DATED : July 20, 1993  
INVENTOR(S) : Noel D. Matchett et al.

Page 1 of 1

It is certified that error appears in the above-identified patent and that said Letters Patent is hereby corrected as shown below:

<u>In Column 11;</u>
on line 65 change "FIG. 8A" to be --FIG. 8B--
also on line 65 change "540" to be --520-- on line 66 change "542" to be --522-- on line 68 change "542" to be --522--

<u>In Column 12;</u>
on line 1 change "541" to be --521-- on line 5 change "FIG. 8B" to be --FIG. 8A--
also on line 5 change "520" to be --540-- on line 6 change "522" to be --542--
also on line 6 change "521" to be --541-- on line 7 change "522" to be --542--
on line 8 change "520" to be --540-- on line 10 change "520" to be --540--

Signed and Sealed this

Fifteenth Day of January, 2008

JON W. DUDAS
*Director of the United States Patent and Trademark Office*